US008180983B1

(12) United States Patent
Jernigan et al.

(10) Patent No.: US 8,180,983 B1
(45) Date of Patent: May 15, 2012

(54) CACHING FILENAMES OF A STRIPED DIRECTORY IN PREDICTABLE LOCATIONS WITHIN A VOLUME LOCALLY ACCESSIBLE TO A STORAGE SERVER NODE

(75) Inventors: Richard Jernigan, Ambridge, PA (US); Robert Hyer, Mars, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 1090 days.

(21) Appl. No.: 12/037,363

(22) Filed: Feb. 26, 2008

(51) Int. Cl.
*G06F 12/02* (2006.01)
(52) U.S. Cl. .......................................... 711/161; 707/827
(58) Field of Classification Search .................. 711/161; 707/827
See application file for complete search history.

(56) References Cited

U.S. PATENT DOCUMENTS

| 6,920,494 | B2* | 7/2005 | Heitman et al. ............... 709/223 |
| 7,024,531 | B2* | 4/2006 | Saika ........................... 711/162 |
| 7,032,091 | B2* | 4/2006 | Ueno ........................... 711/162 |
| 7,441,052 | B2* | 10/2008 | Demaray et al. .................. 710/9 |
| 2005/0097132 | A1* | 5/2005 | Cochran et al. ............ 707/104.1 |
| 2006/0095695 | A1* | 5/2006 | Daniels et al. ................ 711/162 |
| 2007/0094378 | A1* | 4/2007 | Baldwin et al. ............... 709/223 |
| 2007/0255925 | A1* | 11/2007 | Serizawa et al. .............. 711/202 |

* cited by examiner

*Primary Examiner* — Jared Rutz
(74) *Attorney, Agent, or Firm* — Blakely, Sokoloff, Taylor & Zafman LLP

(57) ABSTRACT

A method and system for caching filenames of a directory that is striped across the volumes serviced by a plurality of storage server nodes. The method comprises storing a filename in a first volume and a second volume of the striped volume set in the same locations within the respective volumes. The same locations within the respective volumes refer to the same locations with respect to a reference point of a directory structure in the respective volumes.

22 Claims, 6 Drawing Sheets

CACHING FILENAMES OF A STRIPED DIRECTORY IN PREDICTABLE LOCATIONS WITHIN A VOLUME LOCALLY ACCESSIBLE TO A STORAGE SERVER NODE

CROSS-REFERENCE TO RELATED APPLICATIONS

The present invention is related to currently pending patent application Ser. No. 11/970,452, entitled "Striping Directories Across a Striped Volume Set by the Filenames Contained in the Directories," which was filed on Jan. 7, 2008.

FIELD OF THE INVENTION

At least one embodiment of the invention pertains to network storage systems, and more particularly, to a cluster of storage server nodes that cache filenames in directories.

BACKGROUND

Various forms of network-based storage systems exist today. These forms include network attached storage (NAS), storage area networks (SANs), and others. Network storage systems are commonly used for a variety of purposes, such as providing multiple users with access to shared data, backing up critical data (e.g., by data mirroring), and the like.

A network-based storage system typically includes at least one storage server node ("node"), which is a processing system configured to store and retrieve data on behalf of one or more client processing systems ("clients"). A storage server node may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups. A storage server node provides clients with file-level access. Some storage server nodes may additionally provide block-level access.

A plurality of storage server nodes may be interconnected to provide a storage system environment. Each storage server node may be configured to manage and provide access to (to "service") one or more volumes, with each volume storing files of one or more types (e.g., regular data files or directories). Conventionally, directories are usually stored on a small number of volumes serviced by a particular storage server node. As a result, the storage server node attempting to service the directory access requests may become overburdened, and the overall system speed and performance may be degraded. In particular, Common Internet File System (CIFS) traffic tends to send requests that specify a full path from the root, rather than just a filename within a parent directory. That means a single CIFS call involves the resolution of multiple directory names before the final filename can be resolved. The directories close to the root in the hierarchy may be resolved repeatedly by different CIFS requests. The repeated access to the same directories further increases the workload of the storage server node servicing the directory access request and causes the overall system performance to degrade.

SUMMARY OF THE INVENTION

The present invention includes a method and system for caching filenames of a directory that is striped across the volumes serviced by a plurality of storage server nodes. The method comprises storing a filename in a first volume and a second volume of the striped volume set in the same locations within the respective volumes. The same locations within the respective volumes refer to the same locations with respect to a reference point of a directory structure in the respective volumes.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
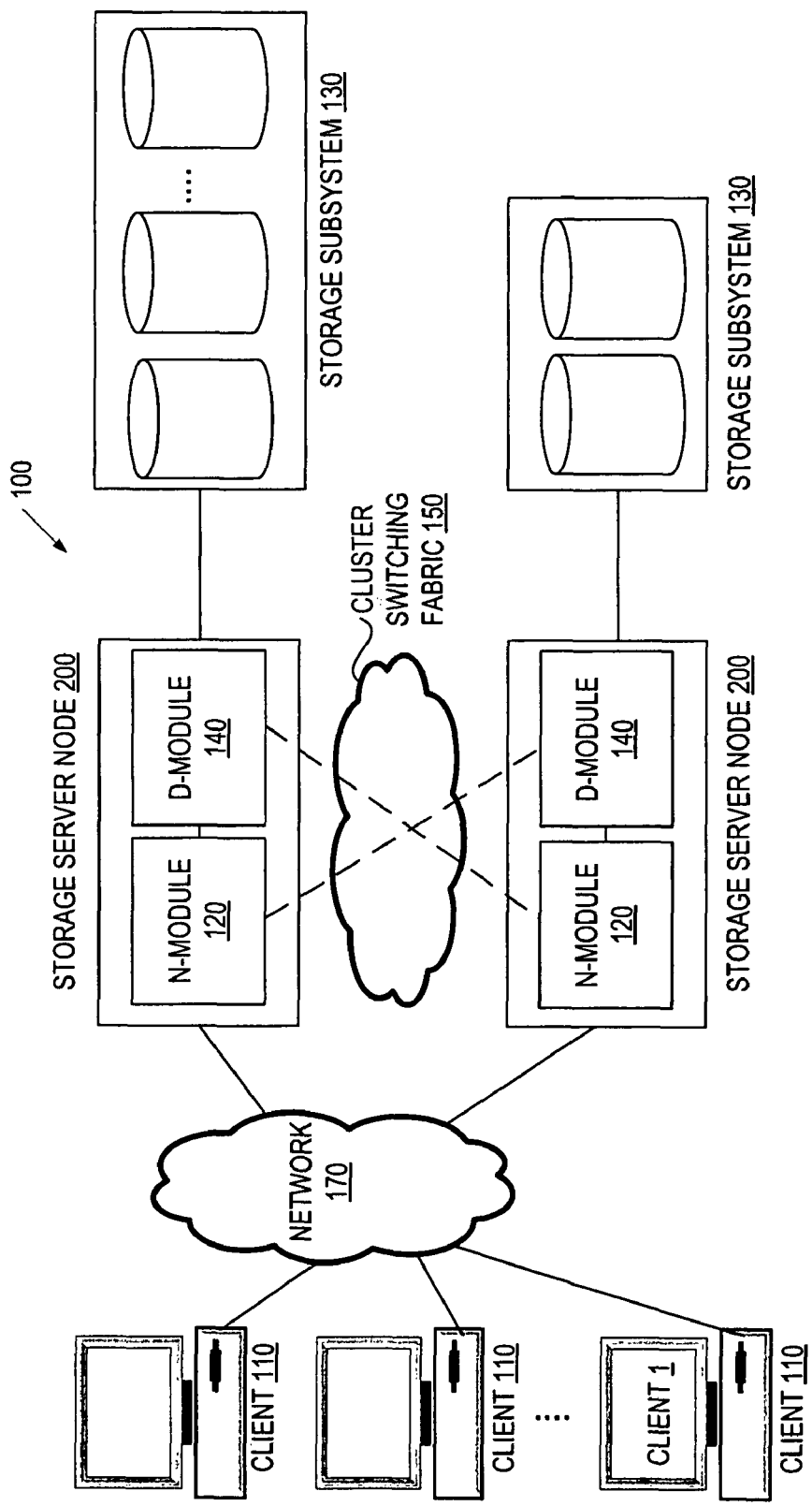
FIG. 1 illustrates an embodiment of a plurality of storage server nodes interconnected as a cluster a network.

A method and apparatus for striping directories are described. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment.

The technique described herein caches ("stores a copy of") the contents of a directory on a plurality of volumes in locations that are highly predictable. The contents of the directory may be striped across the plurality of volumes (referred to as a striped volume set) that are serviced by multiple storage server nodes. These storage server nodes may need to repeatedly consult the directory to resolve the location of a file, a sub-directory, or any types of data or meta-data files in the directory. By caching the directory contents in a predictable location in a volume locally accessible to a storage server node, the time it takes to resolve a file location is greatly reduced. Further, as a cached item can be easily found in a predictable location, system performance for cache updates and cache coherence are also greatly improved.

A directory contains one or more filenames, and the mapping of each filename to an identifier ("inode number") of a corresponding meta-data container ("inode"). The meta-data container describes meta-data attributes of the file having the filename. The directory may be striped by the filenames contained therein. The term "filename" herein refers to the name of a file, which can be a data file, a directory file, or other types of data or meta-data files.

In one aspect, a filename mapping (which includes a filename and its inode number) may have an original copy stored on one volume and cached copies stored on one or more volumes, where the original copy and the cached copies are stored at the same location (illustratively, the offset within the same block) in the directory structure in the respective volumes. That is, if a first filename mapping is stored at byte offset 12 within a third block relative to a fixed reference point of the directory structure (illustratively, the directory header), a copy of the first filename mapping will be cached in the same location (byte offset 12 within the third block) of the same directory on other volumes. Thus, the cached copies of a filename mapping can be easily located when there is a need to update or remove the filename mapping.

Conventionally, all directories in a file system are stored on a single volume, which is serviced by one storage server node. The single volume provides all information necessary for revolving a pathname that includes multiple levels of directory names. However, a bottleneck is created when there are a large number of directory access requests, all of which are serviced by the one storage server node. To resolve the bottleneck, directories are striped across multiple volumes (referred to as a striped volume set) that are serviced by multiple storage server nodes. There is no single designated volume that stores all of the directories in a file system. Instead, filename mappings necessary for resolving a pathname may be distributed across multiple volumes. Thus, a storage server node may need to communicate with more than one other node during the filename resolution process. Some filenames (e.g., the directories near the root level) may need to be resolved repeatedly. The increased inter-node communication may reduce the system performance.

The technique described herein reduces the inter-node communication described above during the filename resolution process by caching filename mappings on local volumes. A volume is "local" with respect to a storage server node if the volume is serviced by the storage server node. A volume is "remote" with respect to a storage server node if the volume is serviced by another storage server node. Thus, after a filename mapping is retrieved from a remote volume, a storage server node will cache a copy of the filename mapping on its local volume to avoid repeating the same query for the same mapping in the future. As access to local volumes is much faster than access to remote volumes, the time it takes to locate a filename mapping is, on average, greatly reduced.

In another aspect of the technique described herein, a cached copy on a local volume is stored at the same location as the location of the original mapping on the remote volume. The "same" locations refer to the same relative locations with respect to a fixed reference point of the same directory that is striped across different volumes. Storing copies of a mapping (the original mapping as well as the cached copies) at the same locations on different volumes makes it easier to locate the cached copies when the original mapping is to be deleted or updated. The locations for storing cached copies are highly predictable when the storage location for the original copy is known. The location for storing a cached copy is a "sparse region" or a "sparse location" in a directory. A directory having these sparse locations is referred to as a "sparse directory." A sparse location is a location in a volume reserved for storing directory contents (e.g., filename mappings), but has not been allocated actual storage. Thus, a sparse location can be considered as a "hole" in a directory structure, which is filled on demand (i.e., when a filename mapping needs to be cached). The directory itself is striped across multiple volumes serviced by multiple storage server nodes. When a file is created, its filename mapping is allocated with a location on one volume. The corresponding locations on other volumes are sparse, meaning that there is no storage allocated to those locations. Those locations are filled when the filename mapping is cached on the other volumes. The on-demand allocation greatly promotes efficient usage of storage space on the volumes.

The technique described herein can be applied to caching directory entries at any levels of a file system hierarchy. The root directory and subdirectories at any level below the root can be cached according to the technique described herein. Thus, it is understood that the term "filename" as used herein refers to the name of a regular file, a directory at any level, or any other type of logical data storage unit.

Before further discussing this technique, it is useful to discuss certain background information and to define certain terminology. In some conventional storage servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time. A "file system" is an independently managed, self-contained, hierarchal set of data units (e.g., files, blocks, or logical unit numbers (LUNs)). Although a volume or file system (as those terms are used herein) may store data in the form of files, that is not necessarily the case. That is, a volume or file system may store data in the form of other units of data, such as blocks or LUNs.

To keep track of the organization of blocks stored in an aggregate, a storage server maintains various hierarchical data structures, called buffer trees. A buffer tree is a hierarchical metadata structure (e.g., a linked list) used by a file system to keep track of the locations of the data blocks of a file, and the root of which is the inode of the file. A buffer tree includes one or more levels of indirect blocks (called "L1 blocks", "L2 blocks", etc.), each of which contains one or more pointers to lower-level indirect blocks and/or to the direct blocks ("L0 blocks") of the file. The direct blocks contain the actual data of the file. A buffer tree may represent, for example, a volume defined within an aggregate, or a file or a directory defined within a volume. The root of the buffer tree is known as an "inode", which is a metadata structure that contains metadata about the file or the directory.

FIG. 1 shows a simple example of a network environment which incorporates a plurality of storage server nodes 200 interconnected as a cluster 100. Each storage server node 200 can be a file server or "filer," in which the technique introduced herein can be implemented. It should also be noted that the technique described herein can be applied in other types of storage systems, such as storage servers which provide clients with either or both of block-level access and file-level access to stored data or processing systems other than storage servers, and network devices configured to provide storage services. One example of the cluster 100 is a Data ONTAP® GX system from Network Appliance™, Inc. of Sunnyvale, Calif.

Referring to FIG. 1, each of the storage server nodes 200 is coupled to a storage subsystem 130 which includes an array of mass storage devices (e.g., disks), and to a set of storage clients 110 (hereinafter simply "clients") through a network 170. The network 170 may be, for example, a local area network (LAN), a wide area network (WAN), a metropolitan area network (MAN), a global area network (GAN), such as the Internet, a Fibre Channel fabric, or the like, or a combination of any such types of networks. Each of the clients 110 may be, for example, a conventional personal computer (PC), server-class computer, workstation, or the like.

The storage subsystem 130 is managed by the storage server nodes 200. Each storage server node 200 receives and responds to various read and write requests from the clients 110, directed to data stored in or to be stored in the storage subsystem 130. The mass storage devices in the storage subsystem 130 may be, for example, conventional magnetic disks, optical disks such as CD-ROM or DVD-based storage, magneto-optical (MO) storage, or any other type of non-volatile storage devices suitable for storing large quantities of data.

Although illustrated as a self-contained element, each storage server node 200 may have a distributed architecture; for example, it may include a separate N-("network") module 120 and D-("data") module 140. In such an embodiment, the N-module 120 is used to communicate with clients 110, while the D-module 140 includes the file system functionality and is used to communicate with an associated one of the storage subsystems 130. The N-module 120 and D-module 140 can communicate with each other using an internal protocol via a cluster switching fabric 150. Alternatively, the storage server node 200 may have an integrated architecture, where the network and data components are all contained in a single box. In this way, all of the storage subsystems 130 can form a single storage pool, to which any client of any of the storage servers has access. It is understood that the N-module 120 and D-module 140 may be implemented by hardware, software, or a combination of both.

Figure 2:
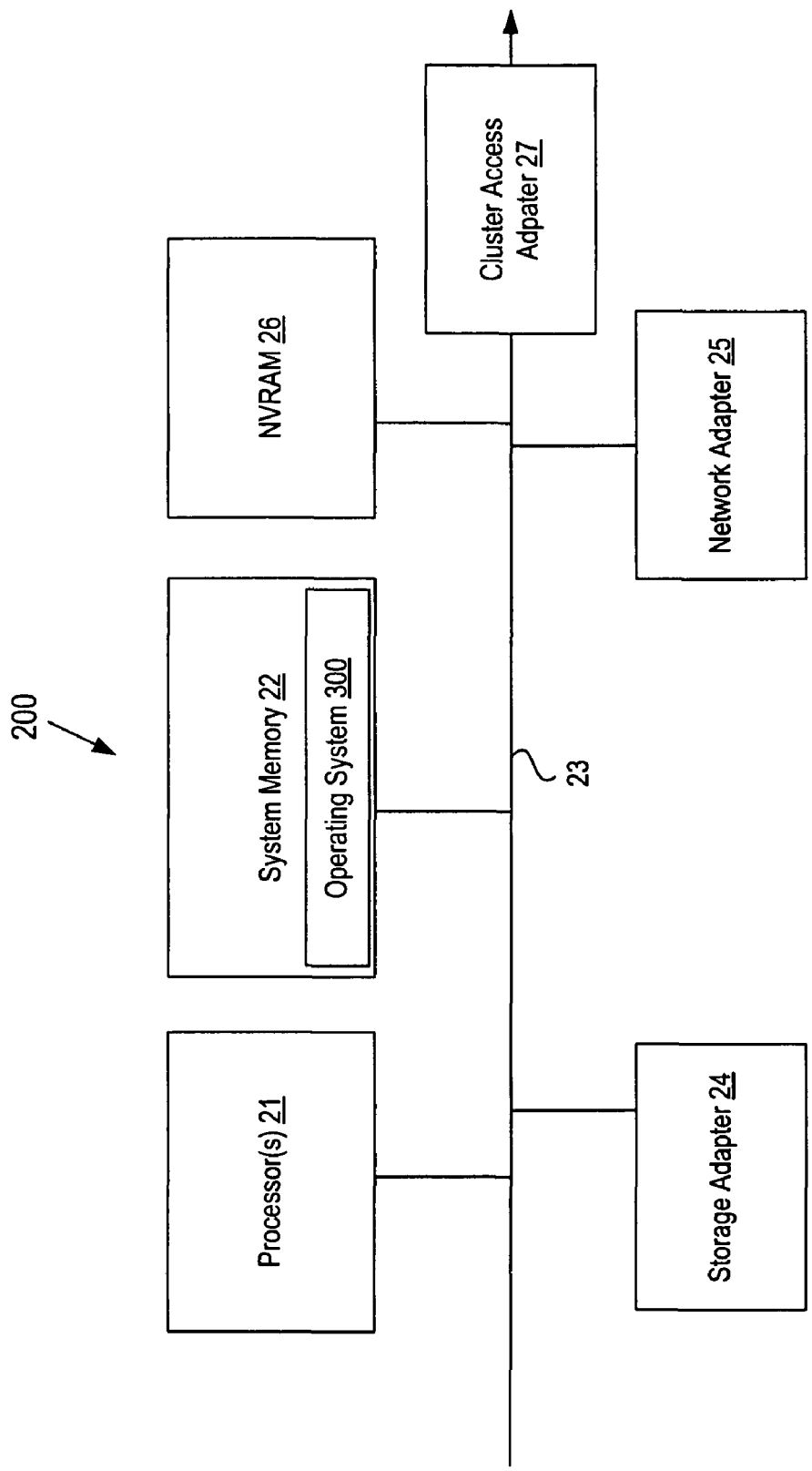
FIG. 2 illustrates an example of the hardware architecture of a storage server node.

FIG. 2 is a block diagram showing an example of the architecture of the storage server node 200 at a high level. Certain standard and well-known components, which are not germane to the present invention, are not shown. The storage server node 200 includes one or more processors 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 21 are the central processing units (CPUs) of the storage server node 200 and, thus, control its overall operation. In certain embodiments, the processors 21 accomplish this by executing software stored in memory 22. Such processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Illustratively, the processors 21 may include a first processor executes the functions of the N-module 120 on the node 200, and a second processor executes the functions of the D-module 140. However, it will be apparent to those of ordinary skill in the art that the node 200 may alternatively comprise a single processor or more than two processors.

Memory 22 includes the main memory (i.e., the "system memory") of the storage server node 200. Memory 22 represents any form of random access memory (RAM), read-only memory (ROM), flash memory, or the like, or a combination of such devices. Memory 22 stores (among other things) a storage operating system 300, which can implement the technique introduced herein.

Also connected to the processors 21 through the bus system 23 are a storage adapter 24, a network adapter 25 and a cluster access adapter 27. The storage adapter 24 allows the storage server node 200 to access the storage subsystem 130 of FIG. 1, and may be, for example, a Fibre Channel adapter or a SCSI adapter. The network adapter 25 provides the storage server node 200 with the ability to communicate with remote devices, such as the clients 110, over a network and may be, for example, an Ethernet adapter, a Fibre Channel adapter, or the like. The cluster access adapter 27 couples the storage server node 200 to other nodes of the cluster 100 over the cluster switching fabric 150.

The storage server node 200 also includes NVRAM 26 to provide fault-tolerant backup of data. The NVRAM 26 is typically a large-volume solid-state memory array having either a backup battery, or other built-in last-state-retention capabilities (e.g. a FLASH memory), that holds the last state of the memory in the event of any power loss to the array.

Figure 3:
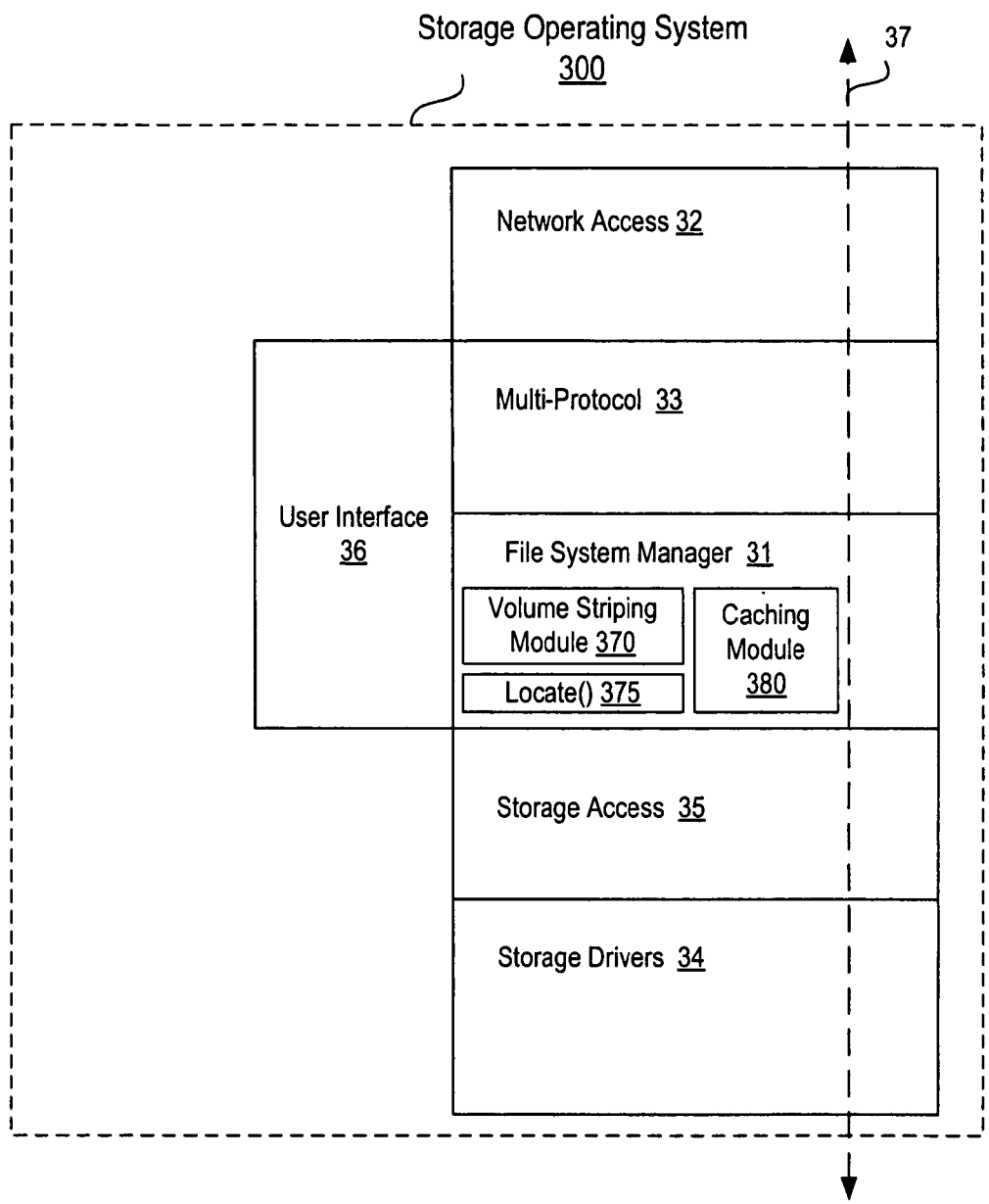
FIG. 3 illustrates the architecture of an operating system of the storage server node according to an embodiment of the invention.

FIG. 3 illustrates an example of the storage operating system 300 for controlling the operations of the storage server node 200. The operating system 300 and its constituent elements are preferably implemented in the form of software. However, in some embodiments, some or all of the elements of the operating system may be implemented in the form of hardware (e.g., specially designed circuitry), or as a combination of hardware and software.

As shown, the operating system 300 includes several modules, or "layers". These layers include a file system manager 31. The file system manager 31 is software that manages the one or more file systems managed by the storage server node 200. In particular, the file system manager 31 imposes a hierarchy (e.g., a directory/file structure) on the data stored in the storage subsystem 130 and manages client-initiated read and write operations at a high level (while delegating certain functions to lower layers of the operation system 300).

To allow the storage server node 200 to communicate over the network 170 (e.g., with clients 110), the operating system 300 also includes a network access layer 32, and a multi-protocol layer 33 operatively coupled between the file system manager 31 and the network access layer 32. The network access layer 32 and the multi-protocol layer 33 implement, at least partially, the network functions of the N-module of FIG. 1. The multi-protocol layer 33 includes a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 32 includes one or more drivers which implement one or more lower-level protocols to communicate over the network, such as Ethernet or Fibre Channel.

To enable the storage server node 200 to communicate with the storage subsystem 130, the operating system 300 includes a storage driver layer 34, and a storage access layer 35 operatively coupled between the file system manager 31 and the storage driver layer 34. The storage driver layer 34 and the storage access layer 35 implement, at least partially, the data-access functions of the D-module of FIG. 1. The storage access layer 35 implements a higher-level disk storage protocol, such as RAID-4, RAID-5 or RAID-DP, while the storage driver layer 34 implements a lower-level storage device access protocol, such as Fibre Channel Protocol (FCP) or SCSI. The storage access layer 35 is alternatively called the "RAID layer" in this description.

Also shown in FIG. 3 is the path 37 of data flow, through the operating system 300, associated with a client-initiated read or write request.

The operating system 300 also includes a user interface 36 to generate a command line interface (CLI) and/or graphical user interface (GUI), to allow administrative control and configuration of the storage server node 200, from a local or remote terminal.

In one embodiment in accordance with the present invention, the file system manager 31 includes a volume striping module (VSM) 370, a Locate( ) function 375, and a caching module 380 in the manner described above and further described below. The VSM 370 implements data access functions and, therefore, is located on the D-module 140 of the storage server node 200 in an embodiment of the invention. As described further herein, the VSM 370 of the D-module 140 interacts with the Locate( ) function 375 implemented by the N-module 120. Using the Locate( ) function 375, the N-module 120 is able to determine an appropriate D-module 120 servicing the volume that holds a requested filename in a directory. That is, when the N-module 120 of a first node receives a request for directory content, the Locate( ) function 375 of that N-module 120 computes a location. If the computed location is a volume serviced by the D-module 140 of a second node, the N-module 120 of the first node will forward that request to the D-module 140 of the second node. Otherwise, the N-module 120 of the first node will forward that request to the D-module 140 of the same node. The VSM 370 of the receiving D-module 140 will then perform the requested file operations.

In one embodiment, after a filename mapping is located on a remote volume by the Locate( ) function 375, the caching module 380 of the first node will cache the mapping on the local volume. The information returned from the second node indicates where the mapping is stored on the remote volume. According to that information, the cache module 380 of the first node will request the same location on its local volume be allocated with storage space and will store the mapping at that location.

Figure 4:
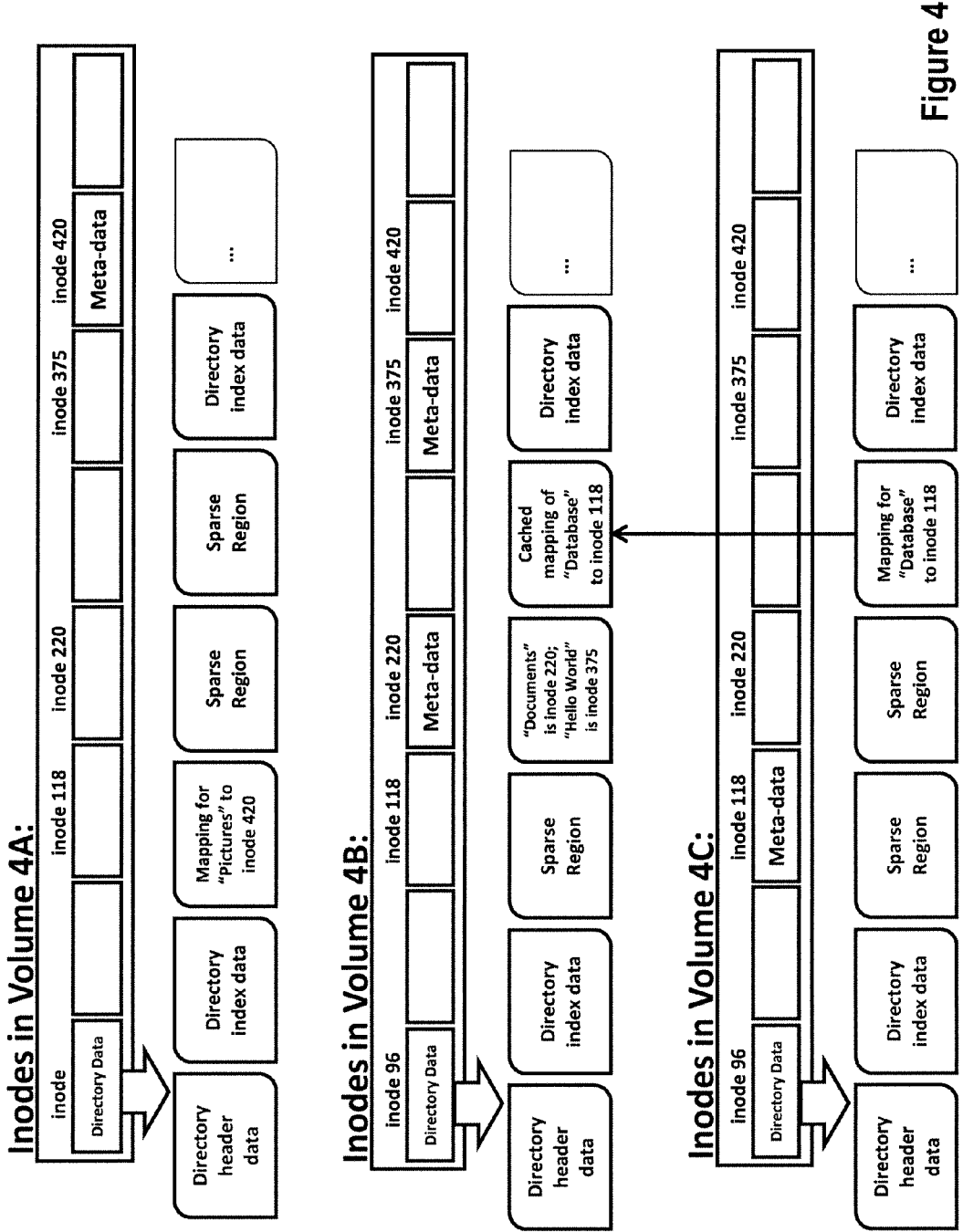
FIG. 4 illustrates an example of a directory that includes sparse locations for caching filename mappings.

FIG. 4 illustrates an example of striping a directory across three volumes (4A, 4B and 4C). FIG. 4 also illustrates sparse locations on the three volumes for caching the directory contents. Each of the three volumes (4A, 4B and 4C) is serviced by, illustratively, a separate one of three storage server nodes (not shown). Having each volume serviced by a separate node minimizes the bottleneck caused by the CPU consumption on the filer. However, it is understood that different embodiments of the present invention may have more than one volume serviced by the same node. Volumes 4A, 4B and 4C form a Striped Volume Set (SVS) across which a striped directory is distributed. Thus, volumes 4A, 4B and 4C are also referred to as the constituent volumes of the SVS.

Referring to FIG. 4, for illustration purpose, each of the horizontal bars is used to represent an inodefile, which includes a number of inodes (represented by the blocks inside the horizontal bar). Illustratively, the directory is associated with an inode number 96 and contains filenames "Pictures", "Documents", "Hello World.txt" and "Database". The mapping of the four filenames to their respective inode numbers are, illustratively:

"Pictures"→inode 420,
"Documents"→inode 220,
"Hello World.txt"→inode 375, and
"Database"→inode 118.

The directory is distributed across volumes 4A, 4B and 4C. Each volume (4A, 4B, or 4C) contains a stripe of the directory. As shown in FIG. 4, inode 96 associated with the striped directory is distributed across volumes 4A, 4B and 4C. The portion of inode 96 on each volume points to a directory structure consisting of a plurality of blocks. The filename mappings are stored in the blocks of the directory structure in these volumes. All of the stripes have the same data structure.

Illustratively, each stripe of the directory contains directory header data (41A-C) and directory index data (42A-C), which are followed by three blocks reserved for storing filename mappings (43A-C, 44A-C and 45A-C), and another directory index data (46A-C). Although each stripe is shown as an array of data blocks, it is understood that the stripes may be organized as a tree or any other suitable data structures. To determine which volume stores the mapping of a filename to its associated inode number, the Locate( ) function 375 of FIG. 3 converts the filename (e.g., "Pictures") into a volume identifier using a striping algorithm. In one embodiment, the filename can be converted into a numerical string using a conversion algorithm (e.g., by mapping each character into a unique bit string). The numerical string can be further hashed into a shorter bit string, which is mapped into a volume identifier (e.g., taking the shorter bit string modulo three). The resulting value (the volume identifier) uniquely identifies one of the volumes (4A, 4B, or 4C) on which the filename should be stored. Thus, instead of storing a directory on a single volume, a striped directory is distributed across the multiple volumes in an SVS. Each volume in the SVS may store a different number of filenames.

The directory associated with inode 96 of FIG. 4 reserves the same locations (43A-C, 44A-C and 45A-C) within the directory structure for storing filename mappings. Moreover, copies of the same filename mapping are stored in the same locations (e.g., the same offset within the same block) with respect to a fixed reference point of the directory structure in the respective volumes. Illustratively, the mapping "Pictures→inode 420" is stored at a given byte offset within the third block (43A) of volume 4A with respect to the beginning of the directory header data 41A. The same locations (the same byte offset within the third block) on volumes 4B and 4C are sparse; that is, those locations are reserved for storing the mapping of "Pictures" and will be allocated with storage when the mapping is cached on volumes 4B and 4C. As another example, the mapping "Database→inode 118" is stored at a given byte offset within the fifth block (45B) of volume 4B with respect to the beginning of the directory header data 41B. A copy of the mapping "Database→inode 118" is cached at the same location (the same byte offset within the fifth block 45C) of volume 4C, and a sparse location is reserved at the fifth block 45A of volume 4A for caching the same mapping when it becomes necessary. It is noted that in an embodiment where the blocks of a volume are organized as a tree structure, the "same location" refers to the same relative location with respect to a fixed reference point (e.g., the root) of the volume. As sparse locations do not actually have storage capacity before storage is allocated, the reservation of a sparse block for caching filenames does not consume any storage resource. It is easy to keep track of all of the copies of the same mapping and to maintain coherency among them, as all of them are located at the same location relative to a reference point on their respective volumes. Thus, when a filename mapping at a first location on a first volume is updated, cached copies of the same mapping can be easily located and similarly updated at the same location, with respect to a reference point of the respective volumes, on other volumes in a striped volume set to maintain coherency.

Figure 5:
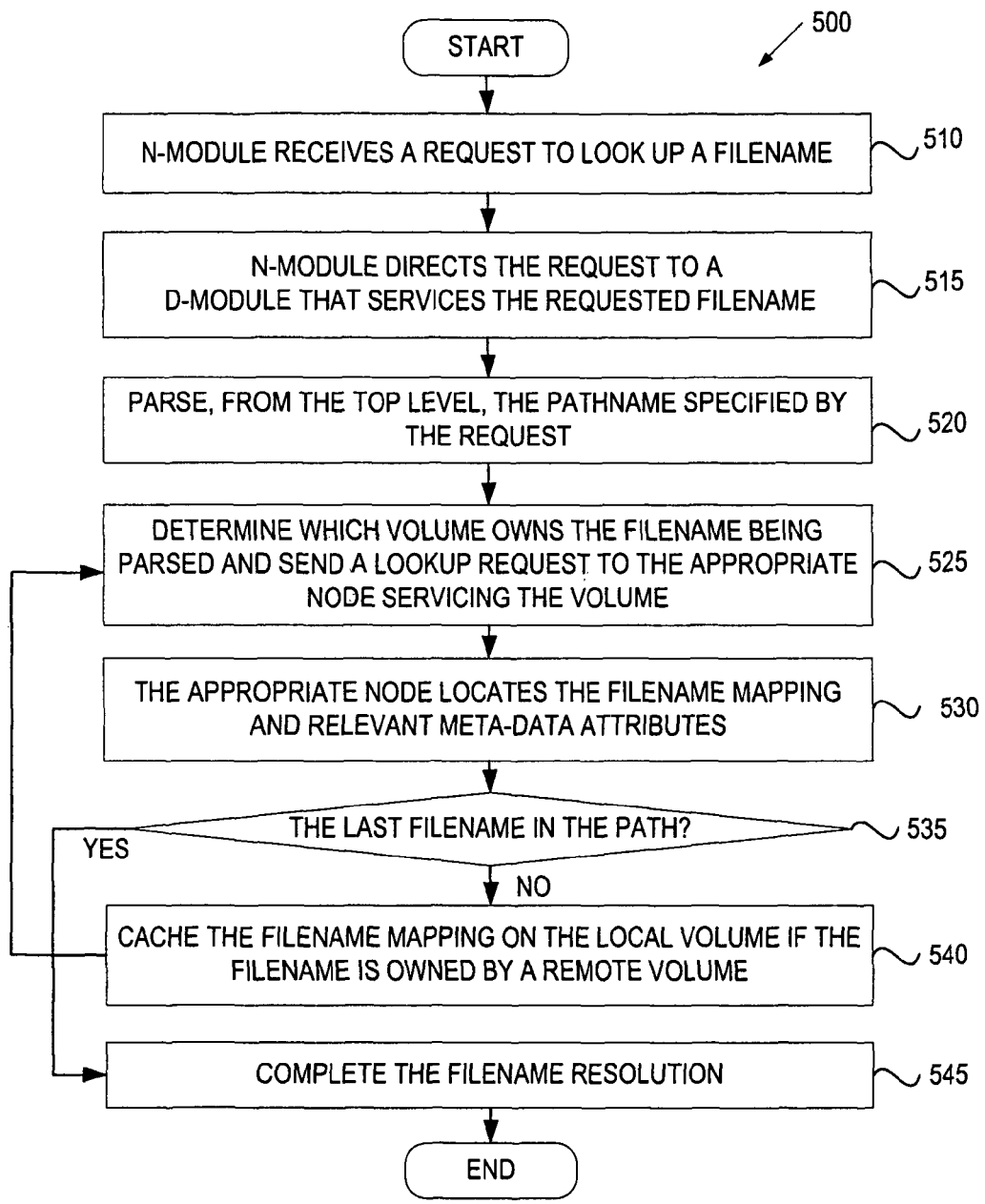
FIG. 5 is a flow diagram illustrating an embodiment of a process for retrieving file attributes using cached filename mappings.

According to the storage system architecture described herein, a filename mapping is cached during a filename resolution process, and a cached filename mapping is removed when the file having the filename is deleted. FIG. 5 is a flowchart illustrating a filename resolution process 500 in accordance with an embodiment of the present invention. The process begins at block 510 with one of the N-modules 120 of FIG. 1 receiving a request to look up a filename from a client 110. In one embodiment, the request provides a pathname that specifies a path that includes multiple levels of directory names. The pathname, illustratively, is dir1/dir2/myfile. At block 515, the N-module 120 determines the D-module 140 servicing the volume that owns the requested filename myfile, and forwards the request to that D-module 140 (illustratively, the D-module 140 of a first storage server node, or a "first node"). In one embodiment, the volume that owns the requested filename is determined by the N-module 120 using the Locate( ) function 375 of FIG. 3 to convert and hash the requested filename to a volume identifier.

Upon receiving the forwarded request, at block 520, the VSM 370 of the D-module 140 of the first node starts parsing the pathname from the top level. At block 525, the VSM 370 of the first node determines which volume owns dir1. The VSM 370 of the first node first check to see whether the name dir1 exists locally—either as a canonically owned entry or as a cached entry. If the volume is a local volume, the first node performs the lookup operation locally. If dir1 cannot be found locally, the VSM 370 calls to a remote node to look up the name dir1. The VSM 370 identifies the remote node by converting (e.g., hashing) the name dir1 into a volume identifier that identifies a volume that owns the name dir1. Following the determination, the VSM 370 of the first node sends a lookup request to the remote node (a "second node") servicing the volume that owns the name dir1.

At block 530, the D-module 140 of the appropriate node finds a filename mapping for dir1 (illustratively, dir1→inode 200) and locates relevant meta-data attributes identified by inode 200, such as a timestamp and ownership. The information is passed back to the first node. At block 535, it is determined whether the filename that was just looked up is the last filename in the requested path. If it is the last filename, the process 500 completes at block 545. If it is not the last filename and if the lookup was performed remotely, the process 500 continues to block 540 at which the caching module 380 of the first node caches the filename mapping on its local volume. The filename mapping cached on the local volume is stored at a sparse location, which was unallocated with storage until the mapping is cached. The sparse location is at the same location as where the filename mapping is stored on the remote volume. The caching module 380 may also cache the other relevant meta-data attributes at the same location.

After caching the remote filename mapping, the process 500 repeats the lookup operations at blocks 525-530, at which the mapping of a next-level directory dir2 is found. The filename mapping is cached on a local volume if the lookup for dir2 was performed remotely (block 540). In one embodiment, prior to the mapping of dir2 is located, the process 500 may check to see whether the filename mappings that have been found so far (e.g., directory dir1) have been deleted from the local volume. The existence of a filename mapping or its cached copy is an indication that the corresponding file (or directory) has not been deleted and the mappings that have been found are still valid. The process 500 continues to look up the last filename myfile in the requested path (blocks 525-530). The last filename mapping is stored locally on the first node (as determined at block 515), so it is unnecessary to cache the last filename mapping. The process 500 then completes at block 545.

Figure 6:
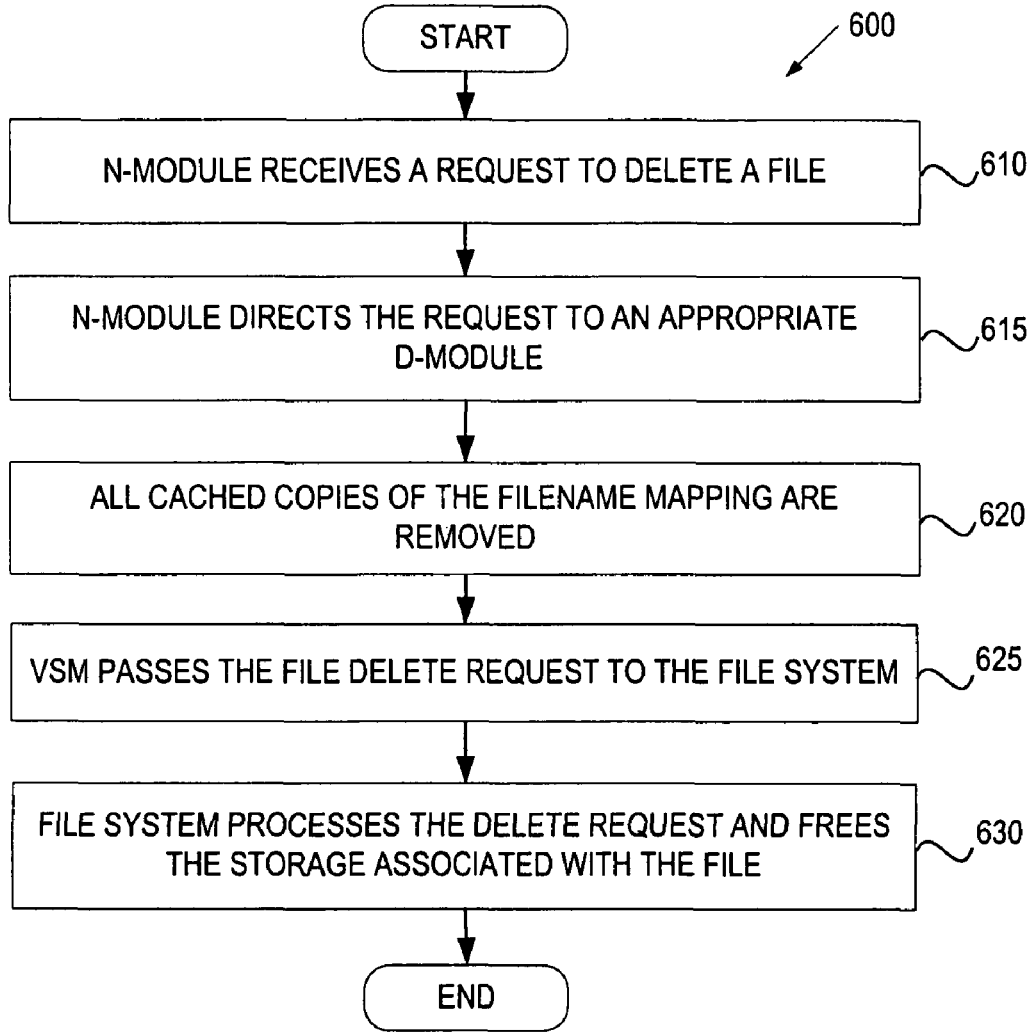
FIG. 6 is a flow diagram illustrating an embodiment of a process for deleting a file.

FIG. 6 is a flowchart illustrating a process 600 for deleting a file in accordance with an embodiment of the present invention. The process 600 begins at block 610 where one of the N-modules 120 receives a client request to delete a file. At block 615, the N-module 120 re-directs the request as a delete file procedure call to the VSM 370 of the appropriate D-module 140 serving the volume that owns the requested filename. At block 620, the VSM 370 receiving the re-directed request determines whether the mapping of the requested filename has been cached at other volumes and causes the removal of all of the cached copies. The cached copies of the requested filename can be easily located as all of them are stored at the same location on their respective volumes. At block 625, the VSM 370 passes the delete request to the file system. At block 630, the file system processes the delete request and frees the storage associated with the file, and the process 600 completes.

Thus, a method and system for caching filename mappings in sparse locations of a directory have been described. Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A storage system comprising:
a plurality of storage subsystems to store a plurality of volumes organized as a striped volume set, across which a directory containing meta-data of files is distributed, each of the volumes comprising a directory data container and a plurality of meta-data containers,
wherein the meta-data of a file is stored in given one of the volumes determined by a first mapping that maps a filename of the file into an identifier of the given volume,
wherein each of the volumes reserves a same corresponding location within the directory data container of the volume for storing a second mapping that maps the filename into an identifier of one of the meta-data containers within the given volume; and
a plurality of storage server nodes coupled to the storage subsystems, each storage server node servicing at least one of the volumes in the striped volume set.

2. The storage system of claim 1, further comprising:
a switching fabric via which the storage server nodes communicate, wherein the switching fabric forwards a request for the second mapping of the filename from a first node of the storage server nodes to a second node of the storage server nodes in response to a determination that the first node does not have a copy of the second mapping.

3. The storage system of claim 1, wherein the same corresponding location for storing the second mapping is allocated with storage on demand.

4. The storage system of claim 1, wherein a first node of the storage server nodes caches the second mapping of the filename in a volume serviced by the first node when a request involving the second mapping of the filename is received by the first node.

5. The storage system of claim 1, wherein a first node of the storage server nodes propagates an update to the filename in a first location of a first volume to the same locations in the other volumes in the striped volume set.

6. The storage system of claim 1, wherein each of the storage server nodes further comprises:
 a network module to receive a request for a file from a client, the request specifying a pathname including directories and a requested filename, the requested filename being at a lowest level of the pathname; and
 a data module to resolve the pathname by obtaining for the first mapping and the second mapping for each of the directories.

7. The storage system of claim 1, wherein the same corresponding locations for storing the second mapping of the filename have the same offsets within the same data blocks in respective directory structures of the volumes.

8. A method comprising:
 distributing a directory containing meta-data of filed across a striped volume set that comprises a plurality of volumes, each of the volumes comprising a directory data container and a plurality of meta-data containers, wherein the meta-data of a tile is stored in a first one of the volumes, the first volume determined by a first mapping that maps a filename of the file into an identifier of the first volume;
 storing a second mapping of the filename at a first location within the directory data container of the first volume, wherein the second mapping maps the filename into an identifier of one of the meta-data containers within the first volume, the first volume serviced by a first storage server node; and
 caching a copy of the second mapping at a reserved location within the directory data container of a second one of the volumes, the second volume serviced by a second storage server node, the copy being cached in response to a request directed to the second storage server node to look up the second mapping, wherein the reserved location on the second volume is a same corresponding location as the first location on the first volume.

9. The method of claim 8, further comprising:
 in response to an update to the second mapping of the filename at the first location on the first volume, updating cached copies of the second mapping at the same corresponding location, with respect to a reference point of the respective volumes, on other volumes in the striped volume set to maintain coherency.

10. The method of claim 8, further comprising:
 delaying allocation of the first location of the second volume until the second storage server node is to cache the copy.

11. The method of claim 8, further comprising:
 receiving a request for the file at the first storage server node, the request specifying a pathname including at least one directory and the filename, the filename being at a lowest level of the pathname;
 resolving the pathname by obtaining the first mapping and the second mapping for the at least one directory; and caching the second mapping of the directory on the first volume in response to a determination that the second mapping does not exist on any volume serviced by the first storage server node.

12. The method of claim 11, wherein the at least one directory in the pathname include a first directory at a first level of the pathname and a second directory at a second level lower than the first level in the pathname, the resolving of the pathname further comprises:
 determining whether a copy of the second mapping of the first directory has been deleted from the first volume prior to parsing the second directory.

13. The method of claim 8, further comprising:
 removing the copy of the second mapping from the reserved location of the second volume before deleting the second mapping from the first location of the first volume.

14. The method of claim 8, further comprising:
 distributing the directory by filenames across the plurality of volumes serviced by a plurality of storage server nodes, wherein one entry of the directory contains the second mapping of the filename stored on the first volume.

15. The method of claim 8, wherein the first location on the first volume and the reserved location on the second volume have the same offsets within the same data blocks in respective directory structures.

16. A method comprising:
 receiving a request for a file from a client, the request specifying a pathname including at least one directory and a requested filename, the requested filename being at a lowest level of the pathname;
 determining that a first volume holds meta-data of the requested filename based on a first mapping that maps the requested filename into an identifier of the first volume, the first volume being part of a striped volume set that comprises a plurality of volumes, each of the volumes comprising a directory data container and a plurality of meta-data containers:
 forwarding the request to a first storage server node servicing the first volume;
 resolving the pathname at the first storage server node by obtaining a second mapping of the directory from a first location within the directory data container of a second volume, the second volume serviced by a second storage server node and being part of the striped volume set, wherein the second mapping maps a name of the directory into an identifier of one of the meta-data containers within the second volume; and
 caching a copy of the second mapping at a reserved location within the directory data container of the first volume, wherein the reserved location on the first volume is a same corresponding location as the first location on the second volume.

17. The method of claim 16, further comprising:
 designating reserved locations on the first volume for caching the directory, the reserved locations remaining unallocated with storage until the first storage server node is to cache the copy.

18. The method of claim 16, wherein resolving the pathname further comprises:
 determining whether any cached copies that are associated with resolved portions of the pathname have been deleted from the first volume prior to parsing a next level of the pathname.

19. The method of claim 16, wherein the same corresponding location is with respect to a reference point and the reference point is a directory header.

20. The method of claim 16, wherein resolving the pathname starts from a highest-level directory specified by the pathname.

21. A storage system, comprising:

a plurality of storage subsystems to store a plurality of volumes organized as a striped volume set, across which a directory containing meta-data of files is distributed by a first mapping that maps a filename into an identifier of a first One of the volumes that stores the meta-data of a tile having the filename, each of the volumes comprising a director data container and a plurality of meta-data containers, wherein a second mapping of the filename stored at a first location within the directory data container of the first volume has a reserved location within the directory data container of a second one of the volumes for caching a copy of the second mapping, wherein the second mapping maps the filename into an identifier of one of the meta-data containers within the first volume, the reserved location on the second volume being a same corresponding location as the first location on the first volume; and a plurality of storage server nodes coupled to the storage subsystems, each storage server node servicing at least one of the volumes in the striped volume set, wherein the storage server nodes maintain coherency among copies of the filename by updating the copies of the filename at the same corresponding location of the respective volumes.

22. The storage system of claim 21, wherein the reserved location is allocated with storage on demand.

* * * * *